UNITED STATES PATENT OFFICE.

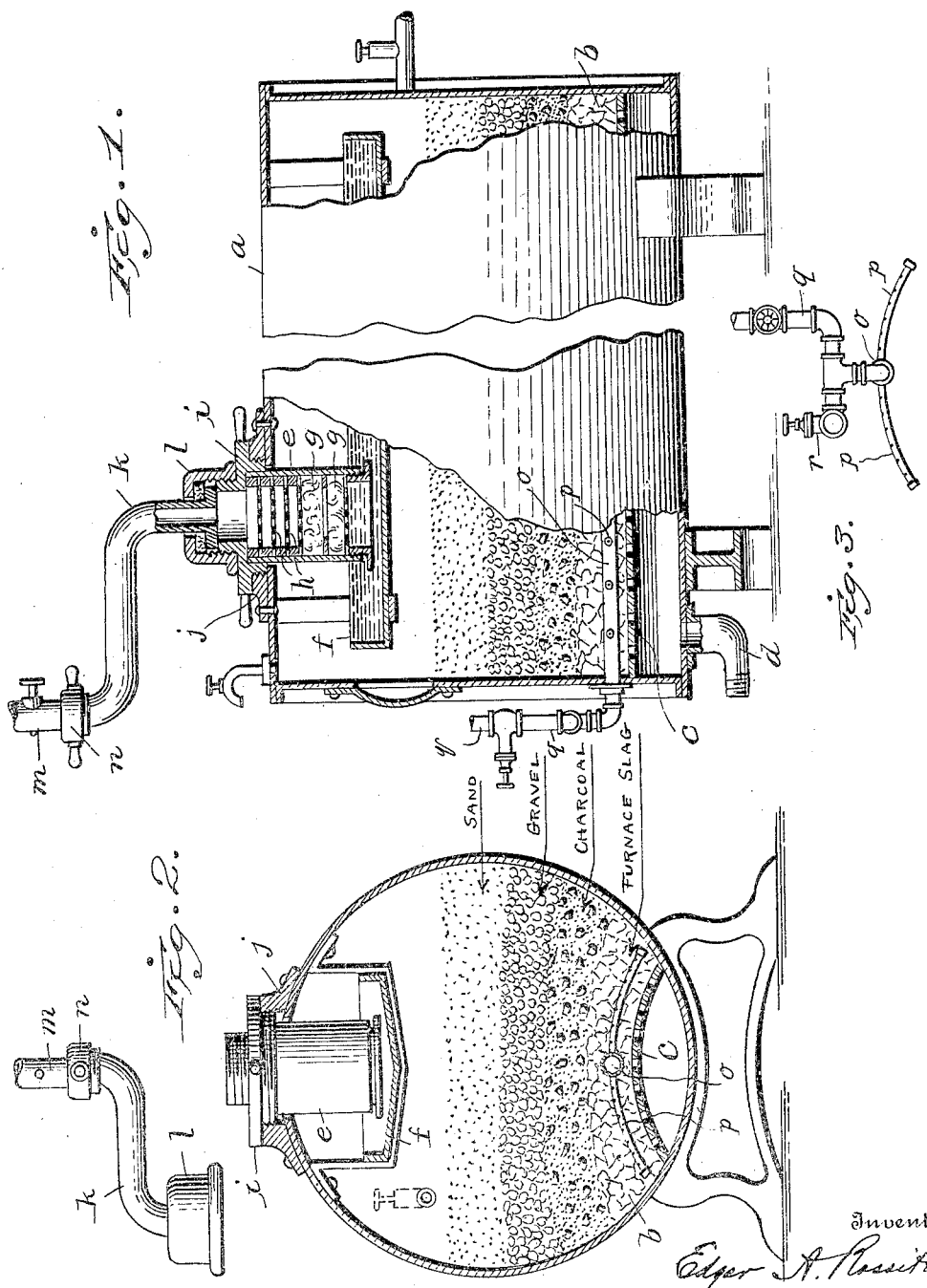

EDGAR A. ROSSITER, OF CHICAGO, ILLINOIS.

WATER-FILTER.

1,326,374.   Specification of Letters Patent.   Patented Dec. 30, 1919.

Application filed October 23, 1918. Serial No. 259,400.

*To all whom it may concern:*

Be it known that I, EDGAR A. ROSSITER, a citizen of the United States, residing at Chicago, county of Cook, State of Illinois, have invented certain new and useful Improvements in Water-Filters, of which the following is a specification.

This invention relates to a filtering plant, and its object is to provide an efficient, simple and inexpensive apparatus as more fully hereinafter described.

In the drawing:—

Figure 1 is a vertical longitudinal sectional view partly in side elevation.

Fig. 2 is a vertical transverse sectional view of the apparatus.

Fig. 3 is a detail view of the washing and aerating pipes.

Referring to the drawing annexed by reference characters, $a$ designates the filtering tank in which is arranged a suitable number of layers of filtering material, such as sand, gravel, or charcoal. Preferably the lowest stratum $b$ consists of broken furnace slag, which rests upon a perforated plate $c$, which forms in the bottom of the tank a collecting chamber to which the outlet $d$ is connected. This layer of broken furnace slag is particularly advantageous not only on account of its porosity, but also on account of its completely sterilized condition, the very high heat of the furnace having destroyed and driven out all those elements which might contaminate the water. This layer of furnace slag efficiently supports the charcoal layer resting upon it, the nature of the slag being such that the charcoal will pack solidly against it without to any material degree seeping into it.

The water is discharged into the tank at the top, through an inlet strainer contained in a cylinder $e$, which depends through the top wall of the vessel. The lower or discharge end of this cylinder $e$ is immersed in water collected in a horizontal trough $f$, this trough extending longitudinally of the tank and serving to distribute the preliminarily-strained water over the top of the filtering bed, thereby avoiding such erosion of the bed as would occur if the liquid were discharged directly onto the bed in a stream. By dipping the depending end of the strainer cylinder $e$ into the trough, it will be observed that splashing of the incoming liquid over the edges of the trough will be avoided, thus insuring all the incoming water to be quietly and uniformly distributed throughout the length of the filtering bed.

Any suitable arrangement of straining means may be employed in the cylinder $e$, but I prefer employing one or more bodies or layers $g$ of sponge, and above these sponge layers there is a series of perforated or reticulated screens $h$. The sponge is particularly desirable because it readily filters out the oily matters in suspension in the water and protects the filtering bed against the formation of an oily scum on the surface of the top layer, thereby rendering frequent cleaning and raking of this top surface unnecessary.

The strainer cylinder $e$ is detachably connected to the vessel so as to be removed vertically therefrom to permit a fresh strainer to be substituted when the one in use becomes foul. As a convenient way of doing this, I provide the upper end of the cylinder with a ring or flange $i$, which is threaded into a flange $j$ attached to the top of the vessel. The inlet pipe $k$ is connected to the flange $i$ by a suitable coupling $l$, this coupling being preferably of screw type so as to permit ready disconnection of the inlet pipe from the strainer-cylinder. The inlet pipe $k$ is in the form of an elbow, and the inlet end of this elbow is coupled to a vertical supply main $m$ by a swivel coupling $n$. This arrangement of the inlet pipe permits this pipe to be swung to one side, as shown in Fig. 2, when it is uncoupled from the strainer, whereby the strainer will be free to be unscrewed and detached from the vessel.

For the purpose of washing and aerating the filtering-bed, I extend a pipe $o$ longitudinally through the lowest layer and provide the same at frequent intervals with lateral perforated pipes $p$, the inlet-end of this pipe being connected to an air-supply-pipe $q$ and also to a water-supply-pipe $r$, whereby air or water under pressure may be forced up through the several layers of the bed and out through the usual overflow.

A feature of importance of this slag body is that when used with the perforated aerating and washing pipes it entirely avoids the objectional clogging of the perforations that occur when a sand-bed is used. The aerating and washing devices are desirably made of copper, bronze, brass, or other non-corrodible metal.

Having thus described the preferred form of my invention, what I claim is:—

1. In a filtering apparatus, a filtering vessel containing a filtering body, a preliminary strainer detachably connected to the vessel, an inlet pipe detachably connected to said preliminary strainer, whereby this preliminary strainer may be readily removed and replaced by a fresh one, said preliminary strainer being arranged to extend into the filtering vessel and the inlet pipe consisting of a swiveled elbow, for the purpose set forth.

2. In a filtering apparatus, a filtering vessel containing a filtering body, a preliminary strainer detachably connected to the vessel, an inlet pipe detachably connected to said preliminary strainer, whereby this preliminary strainer may be readily removed and replaced by a fresh one, said preliminary strainer being arranged to depend into the filtering vessel and said inlet pipe being a vertically arranged elbow adapted to be swung laterally out of the way when disconnected from the preliminary strainer.

3. The combination with a filtering tank, of a preliminary strainer depending thereinto, and a distributing trough into which the depending end of the preliminary strainer depends, to a point below the level of the water therein for the purpose set forth.

In testimony whereof I hereunto affix my signature in the presence of two witnesses.

EDGAR A. ROSSITER.

Witnesses:
 FLOY M. BROWN,
 F. A. WILSON.